United States Patent
Elend et al.

(10) Patent No.: US 9,015,759 B2
(45) Date of Patent: Apr. 21, 2015

(54) INTERACTIVE MAP AND RELATED CONTENT FOR AN ENTERTAINMENT PROGRAM

(75) Inventors: Adam Elend, Sunnyside, NY (US); Michelle Lynch, Santa Monica, CA (US); Joe Ferreira, Westlake Villiage, CA (US); Sean Tice, Brooklyn, NY (US)

(73) Assignee: CBS Interactive Inc., San Francisco, CA (US)

( * ) Notice: Subject to any disclaimer, the term of this patent is extended or adjusted under 35 U.S.C. 154(b) by 48 days.

(21) Appl. No.: 13/355,429

(22) Filed: Jan. 20, 2012

(65) Prior Publication Data

US 2013/0024891 A1  Jan. 24, 2013

Related U.S. Application Data

(60) Provisional application No. 61/510,469, filed on Jul. 21, 2011.

(51) Int. Cl.
| | |
|---|---|
| G06F 3/00 | (2006.01) |
| G06F 17/30 | (2006.01) |
| H04N 21/45 | (2011.01) |
| H04N 21/4788 | (2011.01) |
| H04N 21/845 | (2011.01) |

(52) U.S. Cl.
CPC ........ *G06F 17/3087* (2013.01); *H04N 21/4516* (2013.01); *H04N 21/4788* (2013.01); *H04N 21/8456* (2013.01)

(58) Field of Classification Search
USPC .................................... 725/40, 43, 61, 13, 16
See application file for complete search history.

(56) References Cited

U.S. PATENT DOCUMENTS

| | | | |
|---|---|---|---|
| 7,886,003 B2* | 2/2011 | Newnam et al. | 709/204 |
| 2005/0015803 A1* | 1/2005 | Macrae et al. | 725/41 |
| 2009/0115862 A1* | 5/2009 | Andersson | 348/222.1 |
| 2011/0283322 A1* | 11/2011 | Hamano | 725/44 |

* cited by examiner

*Primary Examiner* — Olugbenga Idowu
(74) *Attorney, Agent, or Firm* — Mahamedi Paradice LLP

(57) ABSTRACT

A system and method for providing interactive content that is correlated to events of an entertainment program.

15 Claims, 11 Drawing Sheets

INTERACTIVE MAP AND RELATED CONTENT FOR AN ENTERTAINMENT PROGRAM

RELATED APPLICATION(S)

This application claims benefit of priority to Provisional U.S. Patent Application No. 61/510,469, filed Jul. 21, 2011; the aforementioned priority application being hereby incorporated by reference in its entirety.

TECHNICAL FIELD

Embodiments described herein pertain to a system and method for providing an interactive map and related content for an entertainment program.

BACKGROUND

Conventional approaches to providing entertainment programs for public consumption include broadcasting the programs through programming channels, such as provided with cable or satellite channels or through over-the-air television channels. Such broadcasts generally limit the audience participation to viewing. More recently, entertainment programs have become more interactive, for example, enabling viewers to vote on an outcome by calling or even texting a desired outcome or result. Such user interaction has become more common with reality-based programs and game shows.

With the advance of the Internet and online services, entertainment programs have been able to enhance audience participation with, for example, web-based content. For instance, it is common for television programs to have fan pages, where viewers of the program can see additional video clips, play games, see plot summaries, and contribute their own program-relevant commentary.

More recently, entertainment programs have been created for web-based publication. For example, AROUND THE WORLD FOR FREE is an online reality-series that is published through CBS INTERACTIVE INC. The program's publications include "webisodes", which provide programming segments in a web page format where audience interaction is encouraged. The use of web-based publications for entertainment programs enables various forms of audience participation, so as to enhance the ability of the audience to experience a program beyond simply viewing it.

SUMMARY

Among other functionality and features, an interactive map is described for use in connection with events, including television programs or web-based programs.

As an example, an interactive map can be provided in an online medium, for use in connection with a broadcast of an episode of an entertainment program, in order to display geographically related events or points-of-interest relevant to the episode or program. The interactive map can serve as a medium for presenting supplemental content and for inviting user participation.

DETAILED DESCRIPTION

Figure 1:
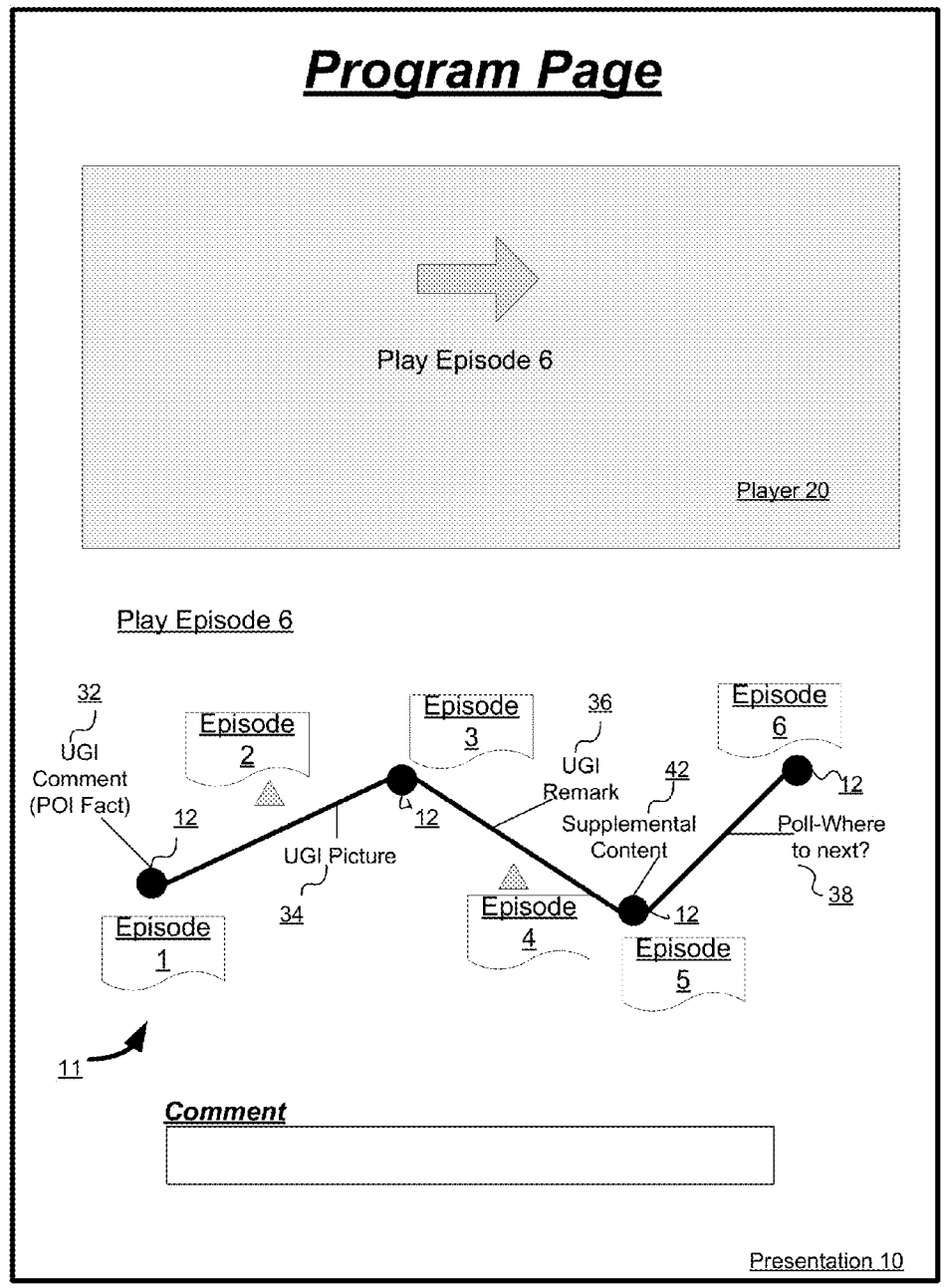
FIG. 1 illustrates an example of an interactive map that can be used to supplement or enhance an entertainment program, according to an embodiment.

Embodiments described herein include a system and method for providing interactive content that is correlated to events of an entertainment program. In particular, embodiments enable the display and use of interactive content, such as a map or geographic display, in connection with events of a reality-based entertainment program. Alternative embodiments may relate to any live and/or time-delayed entertainment program.

According to some embodiments, an interactive map is generated that marks routes of characters and/or points of significance that occur in the course of an entertainment program, and more particularly, in the course of a reality-based entertainment program. In some embodiments, the interactive map enables the use of markers to signify routes taken by characters of the entertainment program, as well to signify the location where events in the program have taken place (or will take place in the future). Such locations can be either non-fictional and/or fictional.

In the examples described herein, an entertainment program is provided at a website that provides access to one or more webisodes, as well as an interactive map that displays links to the episodes and/or relevant user-generated content pertaining to webisodes.

In variations, an entertainment program distributes its webisodes at various locations and/or mediums. For example, a television program can include select episodes only on the Internet. As another example, an online entertainment program can distribute its webisodes through various venues, such as a video hub (e.g., YOUTUBE) and/or a program-specific site.

Still further, an interactive map as described can be utilized by multiple programs. For example, a single map can display geographic-elements related to more than one entertainment program.

Through the utilization of one or more of the various embodiments described herein, a viewer of the entertainment program can have a more interactive experience with the program. Such experiences could include a sense of influencing the progress of the entertainment program including events that occur on the program and/or a stronger sense of direct interaction with the program's character(s). For example, some embodiments enable audience interaction in an online medium to affect an outcome of an event, action and/or the progression of a subsequent portion or plot point in the program. Further, such an approach can enable programmers to create programming that includes greater degrees of game mechanics that will further challenge the character(s) in the programming as well as enhance the viewer's participation in the programming. For example, audience participation can be based upon poll questions, from which the audience members can vote in order to influence an outcome of an event, action and/or the progression of a subsequent portion or plot point in the entertainment program. In another instance, a specific member of the viewing audience could be selected (e.g, via a contest) and provided an opportunity to choose the next action that the character will take on the program.

In one embodiment, a computer-implemented method is provided to generate a map that correlates to events in an entertainment program. In an embodiment, individual events of the entertainment program are correlated to a corresponding geographic location. As part of the map, a route is displayed that includes a plurality of markers, where each of the markers correlates to one of the events of the entertainment program. Each of at least some of the plurality of markers is associated with a content item that is part of, or supplements, the entertainment program.

Numerous embodiments described herein pertain to an entertainment program. Under embodiments described herein, an entertainment program is a video work that includes a theme or storyline, typically involving characters that partake in events which comprise the storyline or theme. Entertainment programs are distributed to audiences using a variety of mediums, such as, for example, a broadcast medium (e.g., cable, satellite or television broadcast), the Internet, streaming or through physical media (e.g., Blu-Ray). Specific examples of entertainment programs include televisions shows, sitcoms or movies.

A reality-based entertainment program is an entertainment program that is not scripted (or one that is at least partially unscripted) and involves recording real-life events of character(s) (who are often real-persons) that participate in events guided by a theme and/or a set of rules. Many of the events that occur in reality-based programs are unscripted or event unplanned, but such events often reflect the entertainment of the programs. Examples of reality-based programs include the SURVIVOR series, THE AMAZING RACE, and AROUND THE WORLD FOR FREE, each of which are distributed by one or more of CBS Corporation's divisions.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic software modules or components. A programmatic module or component may include a software program, a software subroutine, a portion of a software program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of software instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones or general purpose computers) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example of an interactive map that can be used to supplement or enhance an entertainment program, according to an embodiment. In particular, a presentation 10 includes an interactive map 11 provided in connection with a player 20 for episode playback. The presentation 10 can be generated from, for example, a server that serves requests from client devices, such as tablets, personal computers, televisions (e.g., Internet-enabled televisions), set-top boxes, and other media playback devices. The presentation 10 can be in the form of, for example, a web page that enables the user to initiate the playback of an episode while viewing interactive content, such as provided with the map 20.

In one example, the interactive map 11 displays numerous points of significance 12, corresponding to locations of significance in a storyline of the entertainment program. For example, the points of significance can correspond to regions, such as cities or towns that span a country or continent (or multiple countries/continents). Alternatively, the points of significance can correspond to locations within, for example, a specific city. The interactive functionality of the map 11 can, for example, associate episodes (or sub-episodes or clips) of the program with points of significance 12 in a manner that is relevant to the progression of the storyline. A viewer can then select to view episodes from the map 11.

In addition to episode listings, the map 11 may be used to display or provide access to user-generated content that is geographically relevant to the episode. For example, users can publish commentary relevant to a particular point of significance 12. A commentary feature 32 may enable individual users of the audience to submit and/or view commentary that is relevant to a particular location. For example, the commentary feature 32 can be selectable to enable users to view comments that were made by members of the audience about a specific location within the point of significance 12.

The map 11 can also enable users to view and submit user-generated content in the form of pictures. For example, a picture feature 34 can correspond to an icon or thumbnail of a picture that was submitted by a member of the audience. A viewer can select the picture feature 34 to view a user-submitted picture of, for example, a particular location that is near one of the points of significance. In this way, the large audience can get a richer understanding or perspective about the particular point of location.

Additionally, the user-generated content can include remarks 36 individual users of the audience make about, for example, a particular episode event or point of significance. The remarks 36 can be in the form of, for example, a review or rating of the episode, an event in the episode, or a locality that is highly relevant to the episode.

As an additional example, an interactive user poll 38 can also be displayed at a relevant location on the map 11. For example, a poll 38 can be used to gather feedback from the audience as to where the next geographic location of significance should be for the storyline of the entertainment program. Users can submit a response for the poll and/or view its results. The use of polling to guide decision making in the storyline can further enhance the audience participation level.

Geographically relevant supplemental content 42 can also be made accessible through the interactive map 11. For example, advertisement content about a business establishment at a particular location in the bounds of the map 11 may be displayed (e.g., a top restaurant in a particular city).

A feature 44 can also be used to enable the users to submit comments, remarks, pictures or other content. The user can select to associate the comment with a specific geographic location.

Figure 2A:
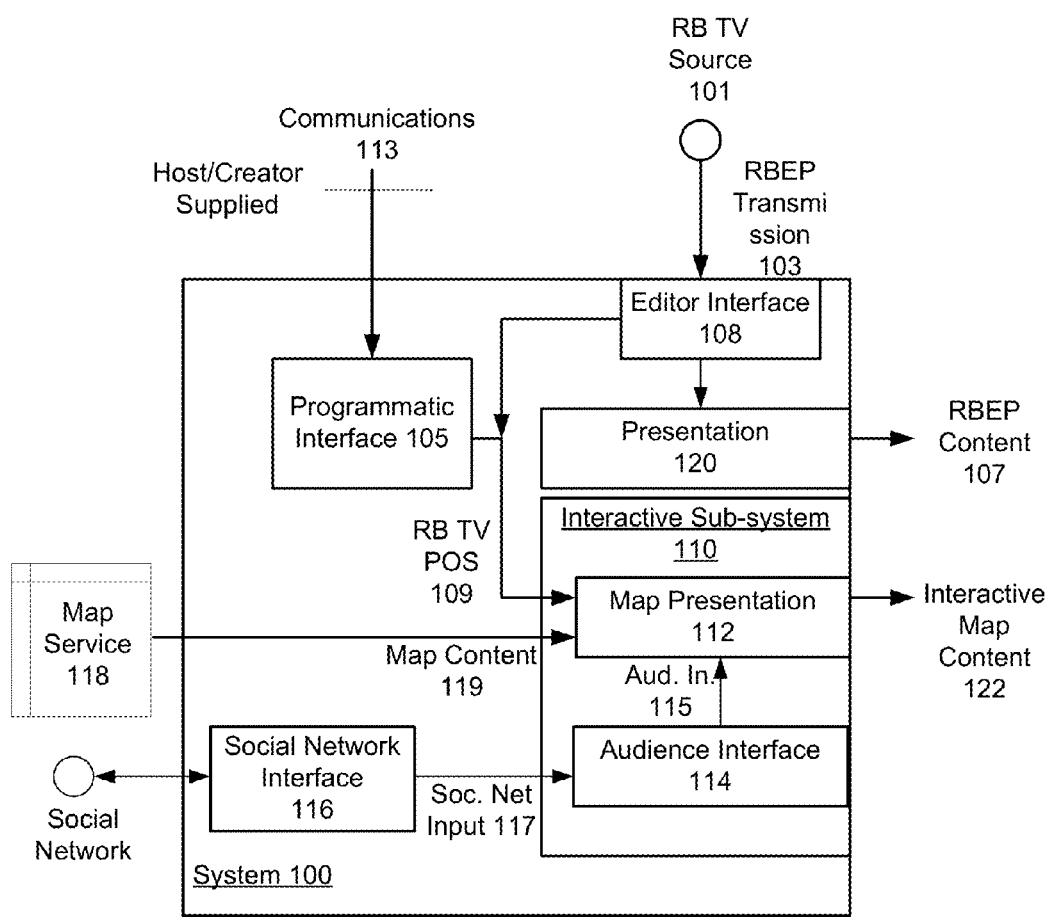
FIG. 2A illustrates a system for generating an interactive map experience in connection with events of an entertainment program, according to an embodiment.

FIG. 2A illustrates a system for generating an interactive map experience in connection with events of an entertainment program, according to an embodiment. FIG. 2A includes a system 100 that can be implemented on a computer system. In one embodiment, system 100 is implemented in a network environment, such as through a website or network source. In this context, the system 100 may be implemented on a server, or a combination of servers (or computers) that combine to deliver functionality and content as described. In other implementations, the system 100 may be implemented in whole or in part on other computing platforms, including client machines, such as terminals that operate applications that can receive over a network (e.g., Internet) the functionality and content as described.

According to one embodiment, system 100 operates in connection with a reality-based entertainment program (RBEP), which can, depending on implementation, be distributed to an audience via a variety of mediums. In one implementation, the entertainment program can be broadcast over airwaves, over cable medium, via satellite or can be distributed on the Internet (e.g., provided at a website and/or distributed as clips on a video site). In some embodiments, system 100 includes an editor interface 108 which receives RBEP transmission 103 from a program source 101. The program source can correspond to, for example, a studio center or network where the program is created (e.g., recorded and edited). The editor interface 108 enables the program to be uploaded for distribution via the system 100 (e.g., over a website or network source). In an embodiment, the RBEP transmission 103 results in the generation (via editor input) of episodes or segments, which can be made available for viewing via components of system 100.

In an embodiment, system 100 includes a presentation component 120 that enables an audience to view RBEP content 107 at, for example, a website. The RBEP content 107 can be rendered from the transmission 103. For example, the transmission 103 may be stored or otherwise provided on one or more websites, which users can access to stream the RBEP content 107 to their device or terminal.

In one implementation, the presentation component 120 can include an Adobe® Flash® Player that links to files that contain the RBEP content 107. The presentation component 120 may process user input to view files, such as a current or past episode or segment. As a variation, the RBEP content 107 may be distributed from the program source, over a network such as the Internet, to an application operating on an end user computing device, such as a browser or web-based application.

Additionally, system 100 includes an interactive sub-system 110 that enables one or more interactive features to be provided to an audience of the RBEP content 107. As examples, the interactive features can include an interactive map (as described below with interactive map content 122), which can be published in connection with distribution of the RBEP content 107 via the presentation component 120. The interactive map can correlate to events of the RBEP content 107, so as to create an interactive map experience for the audience of the RBEP content 107. In one implementation, the RBEP content 107 (as well as other audience interactive features) is integrated into the presentation of one or more interactive features provided from the interactive sub-system 110. In alternative implementations, the interactive features (including the interactive map content 122) can be presented independently of the RBEP content 107.

In more detail, one or more embodiments provide that the interactive sub-system 110 includes a map presentation component 112 and an audience interface 114. The map presentation component 112 receives map content 119 from a map service 118. The map service 118 can optionally be provided as a part of system 100. In an embodiment, the map service 118 utilizes geographic information relevant to the RBEP content 107. The map service 118 provides the base map on which other content correlating to events of the program (as well as user-generated content) is presented on. This can include, for example, the program's geographic points of significance 109 (e.g., as identified from an episode or segment) to generate the map content 119. For example, non-fictional and/or fictional points of significance 109 can correlate to non-fictional and/or fictional geographic locations (e.g., landmarks, street corners, cities or towns) where events occur in a current episode or segment of the RBEP content 107. The map service 118 can be provided by, for example, a service such as GOOGLE MAPS.

In embodiments, the route and/or locations that are pertinent to RBEP content 107 are determined from geo-aware resources that are associated with the program content. In the case in which the RBEP content 107 includes tracking a character (a person in a reality-based program) or set of characters, the characters may be tracked based on geo-tagged communications carried by the persons as they progress along their journey. A programmatic interface 105 may be used to track the persons that are part of the RBEP content 107. In particular, the programmatic interface 105 may process incoming communications 113 from the characters in order to identify localities and coordinates from the geo-tags associated with the incoming communications. The incoming communications 113 may carry various forms of content, including text or images, such as still or video images. For example, the host of a reality-based program may send a geo-tagged text message (e.g., such as a TWEET, provided by TWITTER INC.). In some variations, the programmatic interface 105 operates as part of a social network interface 116. In one implementation, the programmatic interface 105 tracks social feeds (e.g., TWEETS) which are geo-tagged from real-life participants of the entertainment program.

Alternatively, the host may upload a still or video image that is geo-tagged. The programmatic interface 105 may receive the geo-tagged communications 113 from the hosts, and use the communications to identify the points of significance 109. The locations 109 correlate to places where the host transmits a text message or uploads an image, thus correlating to a place where an activity or event occurs in the program. Furthermore, the route may be determined from the points of significance 109 and/or communications 113 from the character being tracked.

In some variations, the points of significance 109, and other geographical information pertinent to the RBEP content 107, can be identified manually, such as through editor interface 108. For example, an editor can track the progress of a character in the RBEP as the RBEP progresses through a mission or storyline. Alternatively, audience members can use the editor interface 108 to identify the program's relevant points of significance 109. As still another alternative or variation, the points of significance 109 can be identified programmatically, such as through scraping audience input, or through analyzing image input from the RBEP content 103.

The audience interface 114 can be implemented as a web page or other interactive medium in which members of the audience can (i) respond to or interact with the RBEP content 107, (ii) respond to or interact with events depicted in the RBEP content 107, such as in real-time as the events occur or are broadcast, (iii) respond to or interact with actions or comments from other members of the program's audience, and/or (iv) participate in online activities that are provided from the site based on the program (e.g., games, chat rooms). Various other kinds of interactive activities may be provided through the audience interface 114.

According to some embodiments, viewers can interact with the online medium by way of chatting with the characters of the program. The type of the chatting can be text, audio or video. The chatting can be done as part of the program, or to supplement the program experience for the viewer or audience.

In one embodiment, the audience interface 114 enables audience members to provide input 115 that is utilized by the map presentation component 112 to generate and integrate user-generated content from the audience into the map content 122. Specific examples of the user-generated content are shown by FIG. 3 and FIG. 4A through FIG. 4F.

As an example, the map content 122 can display a route taken by a character of a program, and the user-generated content can include audience input 115 in the form of comments, tips or other information that pertains to (i) a route taken by a character in the RBEP content 107, (ii) points of significance along the route, and/or (iii) events in the RBEP content 107 that take place at points along the route. In this way, the audience input 115 can be used to generate user-generated content that can be rendered in connection with presentation of the RBEP content 107 and/or other features such as the interactive map content 122. The user-generated content that can be displayed can include text (e.g., comments, reviews), pictures (e.g., pictures an audience member has of a point of interest along a route), videos or links to other content pertaining to the route/geographic region of the interactive map content 122 or RBEP CONTENT 107. The user-generated content may carry tips, commentary, suggestions or feedback, as well as provide content to share an experience. As an example, the user-generated content can correspond to a picture and text that is uploaded by a user depicting the user at a landmark that was also visited by a character in the RBEP content 107.

Still further, as an alternative or addition, the user-generated content can include suggestions by individuals of the audience to influence, for example, the route taken by the character of the RBEP content 107. For example, the RBEP content 107 may pertain to a character that has embarked on a journey, and the next point of interest or geographic region (e.g., city or country) that the character is to visit may be selected from audience input 115 in the form of tips or suggestions (from which polling can also be conducted).

In one embodiment, one or more social network interfaces 116 are provided to further enable audience participation. For example, the social network interfaces 116 may include interfaces to FACEBOOK or TWITTER to enable audience members to post comments or pictures pertaining to the RBEP CONTENT 107. In one implementation, social networking input 117 may be integrated into an interactive map, as described by various embodiments.

Methodology

Figure 2B:
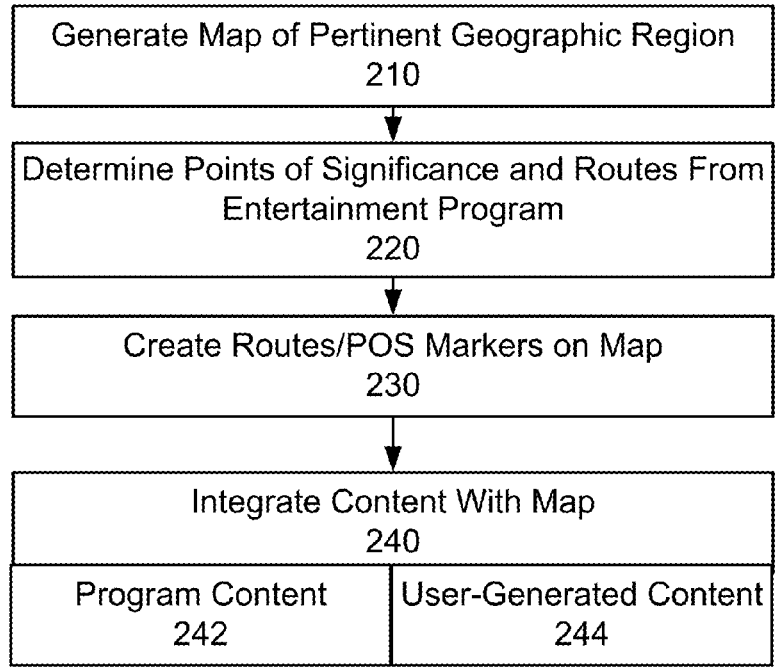
FIG. 2B illustrates a method for generating an interactive map experience in connection with events of an entertainment program, according to an embodiment.
Figure 2C:
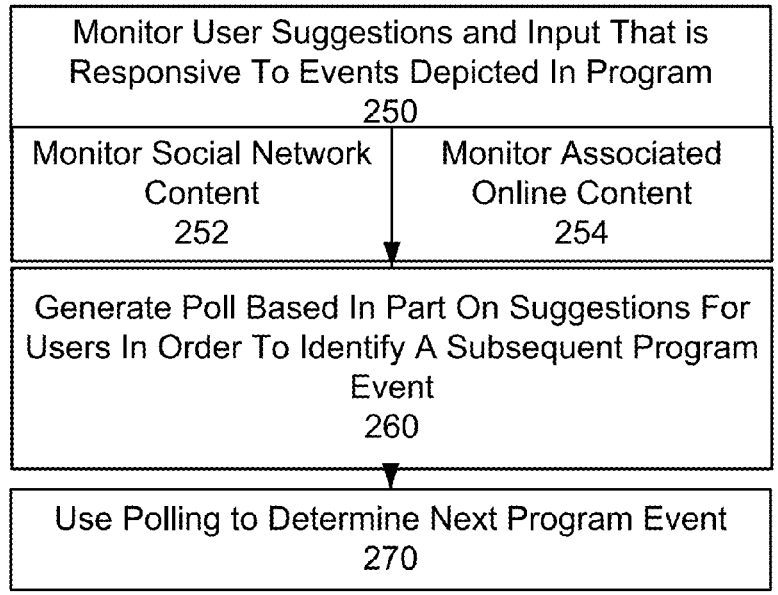
FIG. 2C illustrates a method for generating a poll to guide events of an entertainment program based on user-generated content, according to an embodiment.

FIG. 2B illustrates a method for generating an interactive map experience in connection with events of an entertainment program, according to an embodiment. FIG. 2C illustrates a method for generating polling to guide future events of an entertainment program based on user-generated content, according to an embodiment. Methods such as described with FIG. 2B and FIG. 2C can be implemented using a system such as described with an embodiment of FIG. 2A. Accordingly, reference may be made to elements of prior embodiments for purpose of describing a suitable element or component for implementing a step or sub-step being described.

With reference to FIG. 2B, embodiments provide that a map is generated for a geographic region that is pertinent to the events depicted in an entertainment program 210. In one implementation, the map presentation component 112 generates the map using a mapping service 115, such as GOOGLE MAPS. The map may correlate to a geographic region that is pertinent to the entertainment program. For example, a reality-based program may include a theme where one or more individuals embark on journeys to various geographical regions, such as cities or countries. The pertinent geographic region for such a program would, for example, track the individuals of the program along the journey.

In particular, the points of significance and/or the routes that are relevant to the events depicted in the program event may be determined 220. For example, in a reality-based program, the journey of individuals may include visiting towns, landmarks, countries etc. The points of significance can be determined from the locations where events depicted in the program take place. Such points of significance may also be correlated to episodes that are segments of the program. The route taken by the individuals correspond to the path of the individuals moving from one locality to another. The routes and/or points of significance can be determined by, for example, monitoring the locations of the main character or host (e.g., monitoring GPS communications transmitted from a character's GPS-enabled cellular phone), and/or marking the locations where the character uploaded content or otherwise submitted a communication.

According to an embodiment, an address associated with the system 100 can receive geo-tagged content (e.g., text, image). In response, (i) the location associated with the content is a point of interest; and (ii) the content is uploaded and displayed as having originated from the location (e.g., iconically displayed on an interactive map as originating from a particular location). In an alternative implementation, the points of significance (e.g., the locations from which messages originate) are identified through editor (or alternatively through audience) interaction with the editor interface 108.

In an embodiment, the map component 112 generates markers on the map to indicate a relevant route and/or points of significance for the program 230. The markers may take various forms. A route, for example, may be highlighted on a map that is rendered in either satellite or conventional form. Likewise, markers on the route may represent points of significance 109 correlating to events in the entertainment program (e.g., a stopping point for a character in the reality-based program). Some or all of the points of significance and/or route coordinates can be determined by monitoring communications (e.g., geo-tagged messages) from the character of the program.

In an embodiment, content associated with the program is integrated with the generated map 240. The associated content includes the program content (e.g., portions of RBEP content 107), 242, as well as user-generated content 244. In one implementation, the markers and/or portions of the route may be associated with various items of content that are related to the entertainment program. For example, episodes or segments of the entertainment program may be presented as objects that correlate to markers or portions of the route. The maps may further be interactive, and that user-generated content may be tagged to specific aspects of the map. For example, the relevant route or points of significance may include objects that display text, content and/or other media provided by individuals of the audience for the program. Such content may also be associated with areas in proximity to or surrounding the relevant geographic region.

In FIG. 2C, a method is provided for using audience polling to determine events that are to comprise the plotline or future events of the program. In particular, future events for a reality-based entertainment program may be determined from input received from the audience and further refined or selected by using additional interactive measures such as polling. The interactive, online medium may be used to both present the entertainment program and extract input (e.g., user submitted suggestions that are responsive to events in the RBEP content 107, polling, etc.) from the audience in a manner that enables the audience interactions to guide future events depicted in the program. Specific examples of the types of input the audience may provide include: (i) locations or geographic regions (e.g., countries) where a character of the program is to travel to next, (ii) a decision as to what activity the character is to perform, and/or (iii) input on the development of the plotline.

According to an embodiment, an entertainment program is associated with one or more online mediums in which audience members can respond, participate or otherwise interact with other audience members. Such interactions can be conducted over the course of the entertainment program's presentation (e.g., a season of a reality-based entertainment program). The online mediums can correspond to, for example, a website for fans of the entertainment program, a website where the entertainment program is presented in an interactive manner and/or social network sites that include connections to a website associated with the entertainment program.

The online mediums may include forums including interactive features that encourage creation of user-generated content (e.g., suggestions and feedback). One such interactive stimulus can include an interactive map experience, which details the localities and geographic regions relevant to the entertainment program, and a manner that involves audience participation and input.

According to one or more embodiments, the various online mediums (e.g., programs website, social networking connections) are monitored for audience suggestions and input that is responsive to events depicted in the entertainment program 250. As mentioned, the online medium can be monitored and can include social network mediums (e.g., fan pages on FACEBOOK) that are connected to, or otherwise associated with the program 252, as well as online content at a website that is associated with the entertainment program 254.

In an embodiment, a poll is generated that provides options for future events that can be included in the storyline or theme of the entertainment program 260. At least some of the options in the polling can be based on suggestions or feedback from users, as identified through the various online mediums. For example, in a reality-based entertainment program in which a character undertakes a journey, the next geographic region or location of the character's journey may be determined by polling the audience members. As another example, events, such as contests or what a character will do next, may be decided through polling in the manner described. Specific examples of what can be selected for polling include: landmarks or regions the character can visit; activities (e.g., recreational, job) the character can perform, or persons (or characters) that can be introduced or otherwise participate in the program.

At least some of the options provided in polling the audience can be generated from suggestions or feedback provided through audience interaction with the various online mediums. For example, freeform suggestions and commentary entered by audience members through the various online mediums may be scanned to identify localities or suggestions of future events. The scanning may be performed programmatically, such as through keyword analysis, as well as performed manually, such as through editors. In the example of the reality-based entertainment program in which a character undertakes a journey, the storyline may generate enthusiasm by the audience resulting in feedback and commentary from audience members as to what should happen next. This feedback and commentary can be provided through the online mediums as described above. The feedback and commentary can be analyzed programmatically or manually in order to determine polling choices for the audience.

As an example, a poll may be generated and distributed to the audience in order to determine the audience's reaction to possible options in the storyline for the entertainment program 270. The poll may be generated to be relevant to a timeline that is responsive to the current episode or segment of the entertainment program. In one embodiment, the polling may be generated and implemented in real time, to influence the outcome of a particular episode of a program before it is completed, using suggestions and feedback provided by the audience. In other implementations, the polling may be implemented after an episode is completed in order to establish a framework for which events are to occur in a follow-up episode. In this way, user interaction may be utilized to determine polling choices, which in turn can be used to determine outcomes for an episode, or for a portion of a program.

As mentioned, the interactive map experience can be used as a mechanism to generate enthusiasm amongst the audience, which in turn can generate suggestions and feedback and other user-generated content. Such content is scraped or otherwise parsed (manually or programmatically) in order to identify suggestions or other user-generated input that can qualify for polling options.

Interactive Map Presentations

Figure 3:
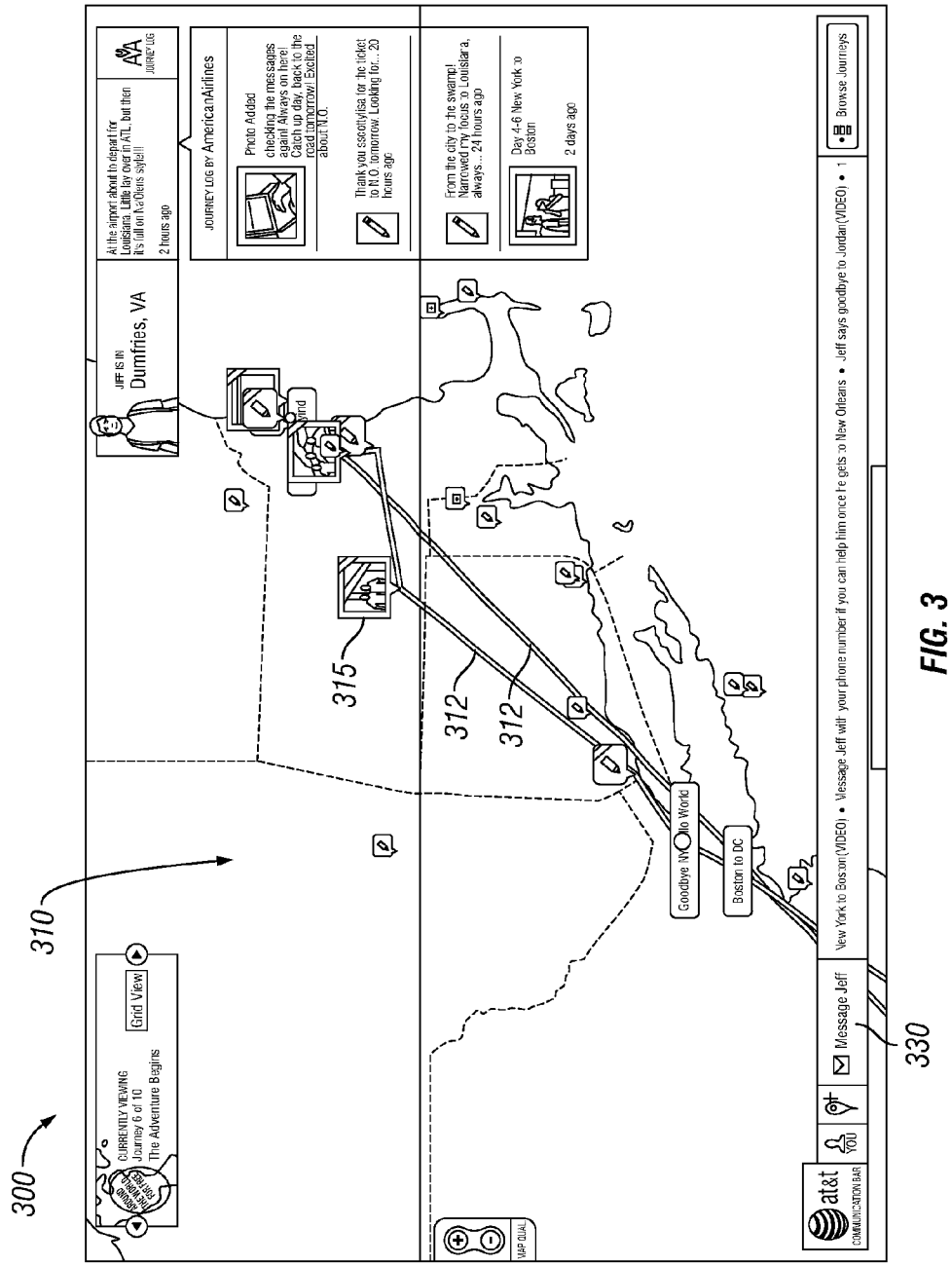
FIG. 3 illustrates an interactive map that depicts events of an entertainment program, according to an embodiment.

FIG. 3 illustrates an interactive map that depicts events of a reality-based entertainment program, according to an embodiment. In implementation shown, a map presentation 300 includes a map 310 of the geographic region that is relevant to entertainment program (e.g., map of Northeast America). In the example of the reality-based program in which a character undertakes a journey, the example shows the character's route through Northeast America. The route taken by the character is depicted by Route Marker 312. Other markers identify points of significance 315 are shown. The points of significance 315 can include, for example, (i) those that are inherently of interest to the relevant geographic region (independent of advanced pick done in the program content), (ii) a location at which the character(s) (of the reality-based program) performed some action or recorded some event, (iii) locations of events that occurred as part of the reality-based entertainment program, and/or (iv) locations of events that occurred outside of episodes in the reality-based program (e.g., off-screen adventures that were edited out of the program presentation).

In the example depicted, the program follows a main character (named Jeff) along route 312. At various points, the main character makes an entry, which can include (i) a text entry (identified by pencil icon), and/or (ii) a picture taken by or for the character at a particular location shown on the route.

The map presentation 300 may further be integrated with interactive functionality to enable the members of the audience to interact with either the character, the editors of the program or each other. The map presentation 300 may show a current location of the character along his journey, and enable the user to message information to the character that is pertinent to the current location, time or circumstance. Accordingly, the map presentation may include messaging functionality 330 to enable the user to generate messages that are carried to a character of the program, or presented on the interactive map in a manner that editors of persons involved with the program content to view messages from the audience. For example, the messaging functionality can be used to communicate suggestions or tips to the program (e.g., to the characters or the program creators) as to what a character should do in a particular location or region, points of significance, or the next geographic region that the character should visit. Additionally, as mentioned with other embodiments, such feedback provided by individuals of the audience can be used to determine or influence an episode or current event of the program.

FIG. 4A through FIG. 4E illustrate variations to a map experience, which includes user participation that correlates to events of a reality-based entertainment program, according to an embodiment. The various examples displayed in the accompanying figures may be generated through use of, for example, a system such as described with an embodiment of FIG. 2A.

Figure 4A:
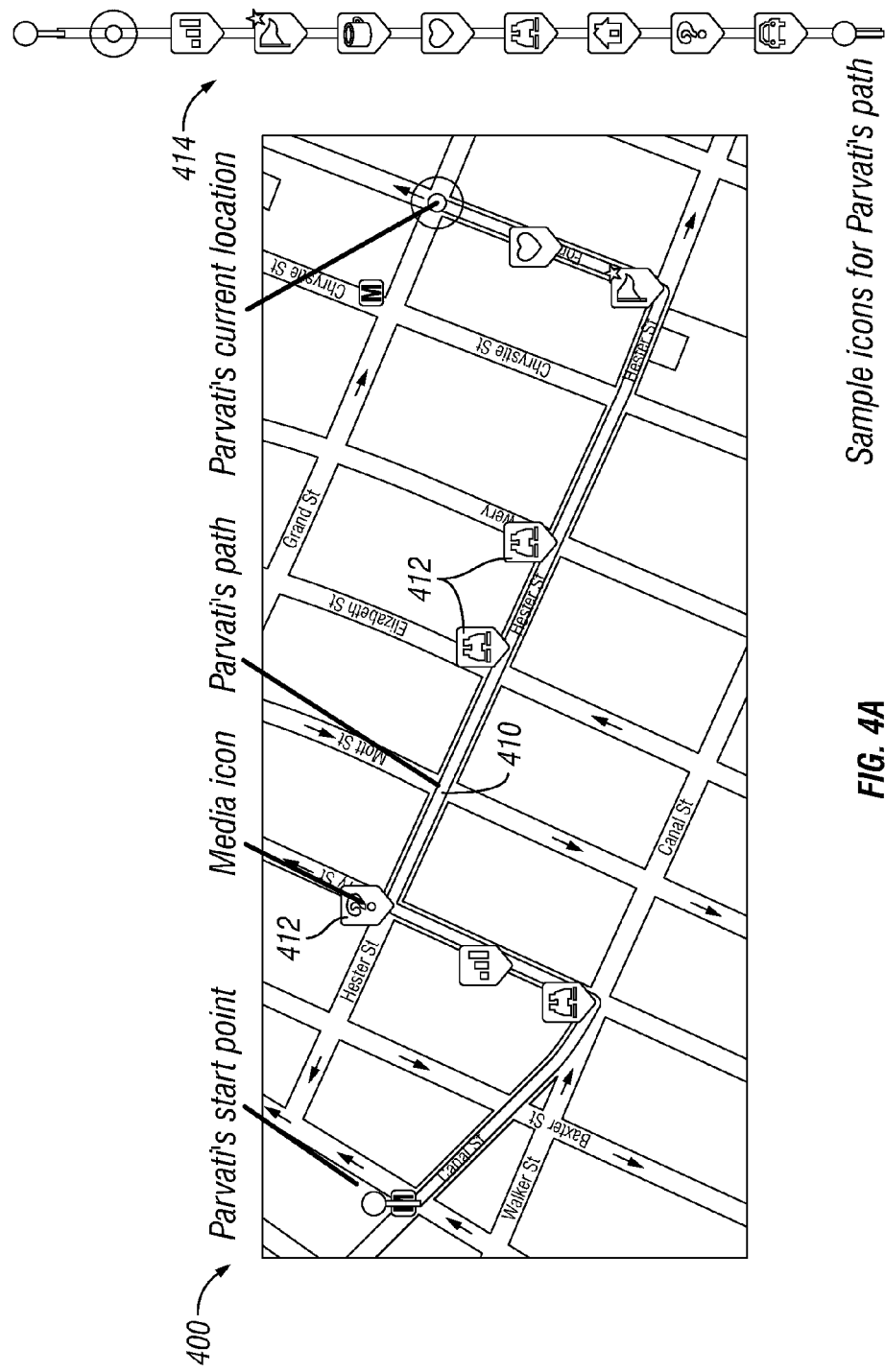
FIG. 4A through FIG. 4F illustrate variations to a map experience that includes user participation that correlates to events of an entertainment program, according to an embodiment.

FIG. 4A illustrates a map 400 that identifies a route 410 that correlates to events that occur in an entertainment program. In particular, the route 410 may track the events depicted in a reality-based entertainment program, such as a program in which characters undertake a journey or trip. In the example provided, the route 410 depicts the journey of a character is a reality-based program. The route 410 identifies multiple points of significance 412, of which at least some may correlate to an event that occurs on the journey. For example, for a program that follows a character on a journey (shown in part by the route 410), the points of significance 412 indicate locations along the route in which the main character performed some action (e.g., ate at a restaurant, met a celebrity, etc.). The events may be associated with different kinds of content items, such as pictures (or slide shows), text (e.g., information text about what happened to the character), or video clips. In some implementations, segments or episodes of the program content are associated with the points of significance 412.

In some embodiments, the points of significance 412 include icons for markers. The icons may be representative or informative of the event that correlates to the point of interest. An event list 414 may further be included in connection with the interactive map in order to display in linear (or non-geographic fashion) the markers that correlate to content of the program (or alternatively, user-generated content). The event list 414 enables the viewers to scan the events and associated content without use of an underlying map or geographic relationship.

Figure 4B:
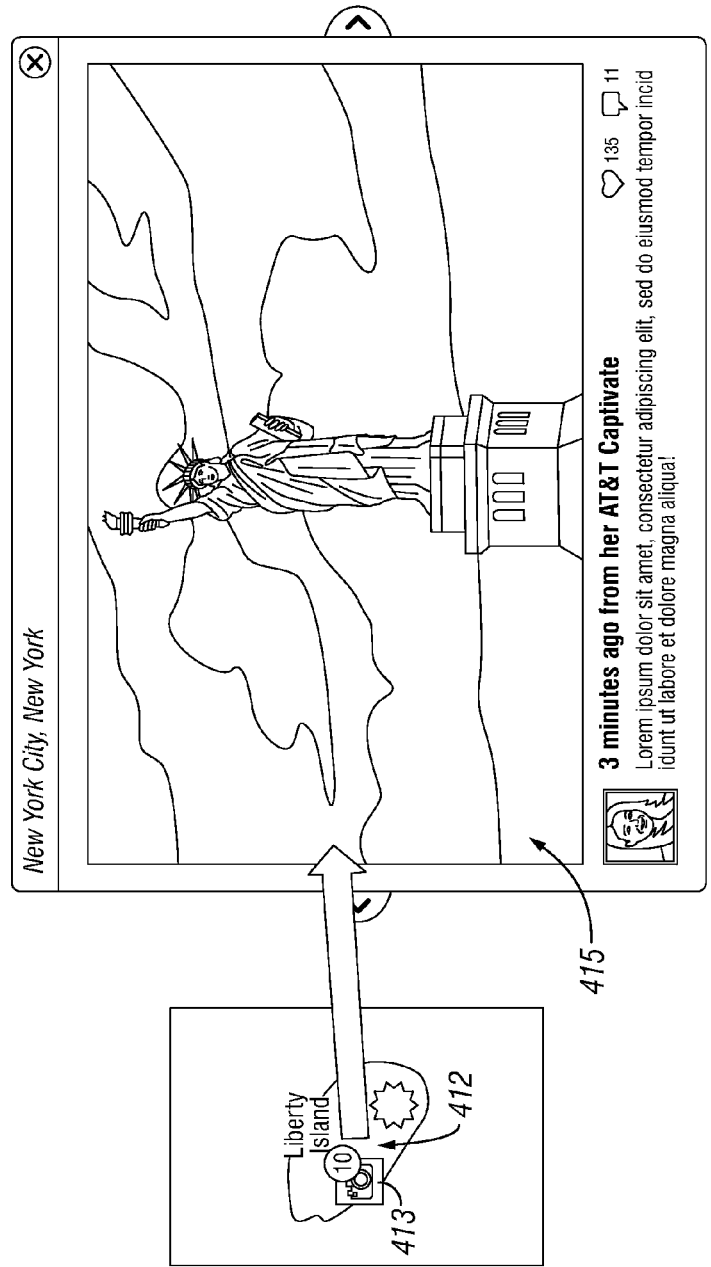

FIG. 4B illustrates a content item that can be associated with a point of interest 412. The point of interest 412 may be marked by, for example, an icon 413. The icon 413 can indicate information about the event or the content (e.g., type of content provided). In the example provided, the content item 415 corresponds to a slide show (multiple pictures), although other forms of content items may be used (e.g., text, audio, video clips).

Figure 4C:
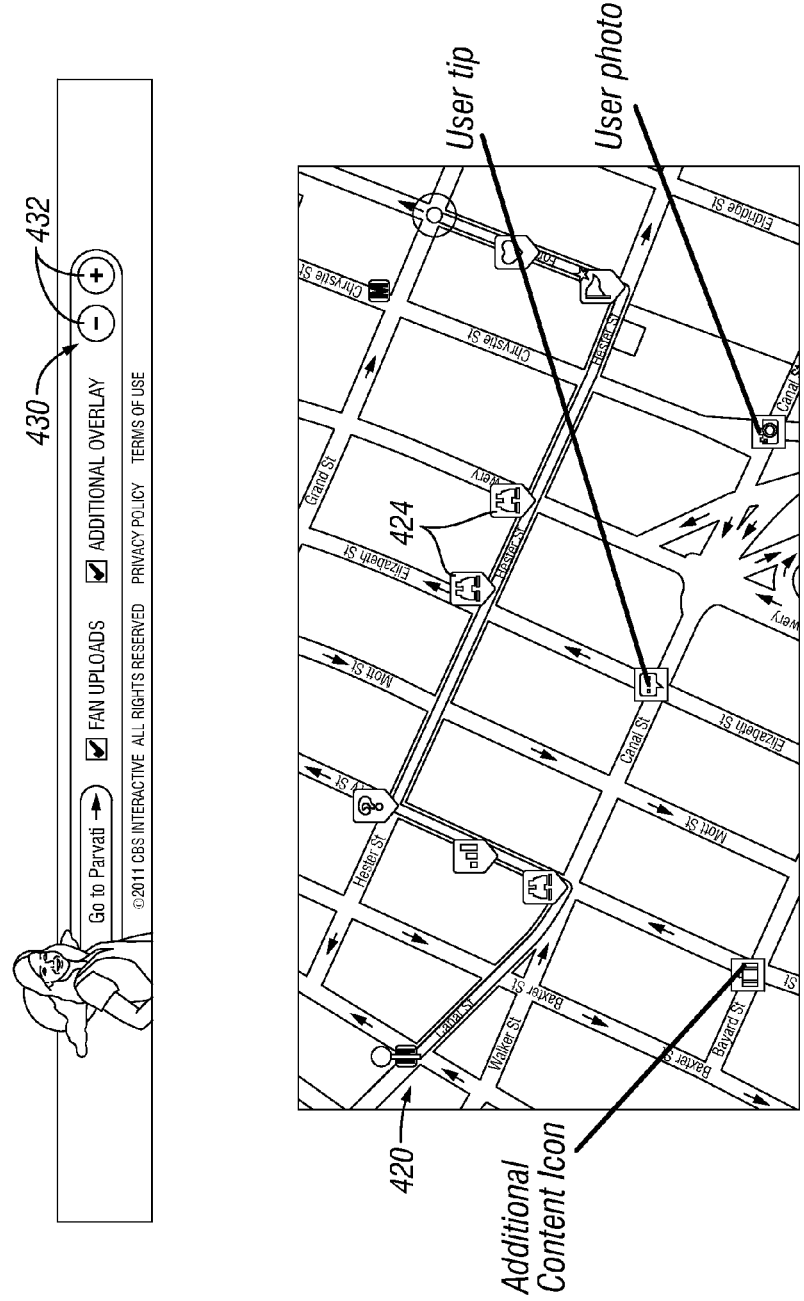

FIG. 4C illustrates an interactive map 420 that combines points of significance with user-generated content and other information, according to one or more embodiments. In an embodiment, the interactive map 420 includes overlays of tiered content ("overlays"), which can be associated with points of significance (or the icons), portions of the route, or other points of the geographic region. The overlaid content can identify a program that is part of the programming content (e.g. image taken by host), overlaid by content from users that pertain to, or have been provided in association with, a particular relevant locality or point of significance 109.

In an implementation shown, the user can focus on a given icon 424 or other feature that represents event content (content depicting an event that is part of or otherwise associated with the program). In some cases, the icons 424 can be selected to view additional tiered content, which can include user-generated content that is associated with the particular point of interest. The user-generated content can include tips (e.g., suggestions from the user as to what the character of the reality-based program should do at a particular location), pictures, or other comments or feedback that the members of the audience would like to publish or share.

In one implementation, the tiered content can be displayed with a user-interface feature 430 that enables the user to navigate through various content items, including content items corresponding to user-generated content. The user-generated content may include a feature to select event (or program) content or user-generated content, as well as control features 432 to let the user navigate forward or backward through a series of content items.

Figure 4D:
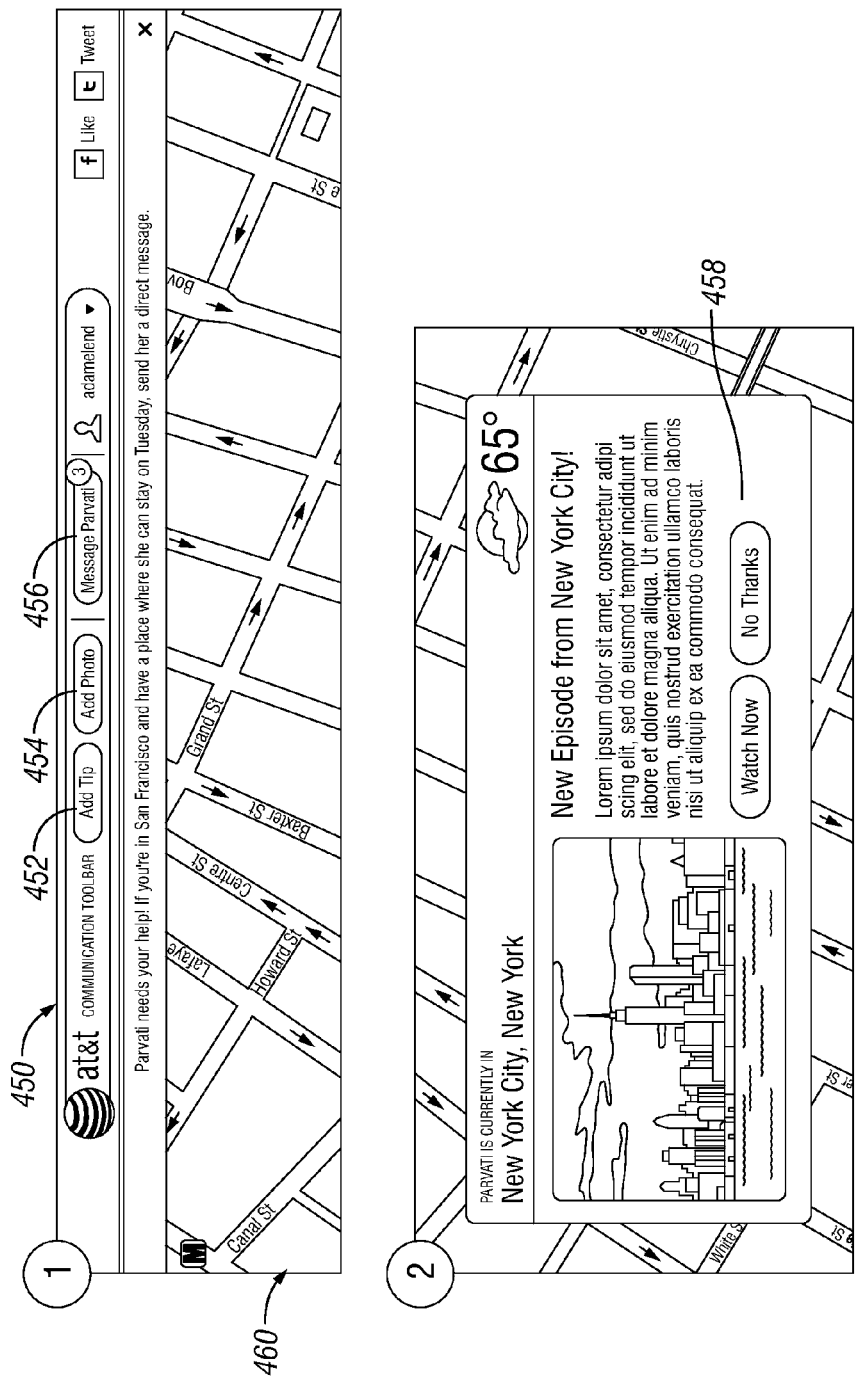

FIG. 4D illustrates an embodiment in which viewers of the entertainment program are provided a user-interface 450 to interact with the program (e.g., with the main character of the program). In one embodiment, the mode of interaction is to enable the user to perform one or more of the following actions: submit tips (e.g., recommendations or information) pertaining to a particular locality or event, submit relevant images for the viewers of the program or the main character of the program, or to message the characters of the program. In an example provided, features of the user-interface 450 include a tip feature 452 (user submits a tip for the program, such as a place to visit or an activity of interest), a content upload feature (e.g., user can submit related images) 454, or a character/host messaging feature 456. The character messaging feature 456 can link the viewer to, for example, the host of the interactive program. For example, the viewers may use the feature to send a text message, an email or a TWEET to the host of the reality-based program. Alternatively, the user may use the feature 456 to send a communication to the creators/editors affiliated with the program, who can then respond or otherwise act on the communications on behalf of the character. Numerous such variations are possible.

In one embodiment, the user-interface 450 is displayed concurrently with a rendering of a segment or episode of the program. For example, a current episode may be broadcast or made available for viewing at a particular time period, and viewers of the episode at the time period can have the ability to interact with the program by making suggestions, messaging the character(s), or otherwise providing user-generated content to supplement the experience of the audience. Suggestions or information provided by the viewers may be incorporated into the events of the program in subsequent segments or episodes. In some variations, the segment or episode may be live, and user suggestions or tips may be incorporated into the program segment in real-time. In the example provided, a program presentation object 458 (e.g., media player object) is provided to enable the viewers to select to view a current or archived episode or segment. The presentation object 458 may correspond to, for example, a media player (e.g., FLASH player) that executes on a website.

In some embodiments, the user-interface 450 is provided in connection with an interactive map 460 that includes information and/or content about the program. In specific implementations, an episode of the program content may be rendered concurrently with an interactive map that displays a geographic region, including overlay items (e.g., points of significance, host-generated content, user-generated content) that is specific to the geographic region that is relevant to the episode of the program content. For example, the interactive map 460 may display points of significance 109, the route of the main character on his or her journey, the content (e.g., messages or images) provided from the program, and/or user-generated content (e.g., user-supplied text messages and images).

Still further, some embodiments provide that the interactive map 460 displays a geographic region (e.g., a city) that is pertinent to an episode of the program that is made available with the map. For example, the interactive map 460 may be displayed on a web page, along with a media player object 462 that is pre-associated with an episode of the program. The user can watch the episode by clicking on the player object. The interactive map 460 may be based on a geographic region that is pertinent to the localities shown in the episode provided through the player object. In one implementation, the user can perform some action to initiate the episode to be rendered on the player object (e.g., a click action), initiating playback of the associated episode. While the story is being presented, the interactive map 460 may be displayed to include the points of significance, the route, the content generated from the host or characters of the program, and the user-generated content (as it is submitted).

In some variations, various overlay items of the interactive map 460 (e.g., the points of significance 109, the route, and the content generated from the character or host of the program) is progressively rendered on the interactive map 460 as the episode runs, so that the overlay items are synchronized in time with the program as the program is rendered.

In one embodiment, the interactive map 460 and the program presentation object 458 (e.g., FLASH player) are displayed on a common medium, such as a web page or application screen for a web application. Functionality such as synchronizing the display of the content/information on the interactive map 460 with the events of the program as it is rendered may be achieved programmatically. For example, the overlay items of the interactive map 460 can be displayed in connection with a timeline that is determined by events of the episode (e.g., places where the host stops to take a picture or participate in some event as part of the episode of the segment). In this way, the rendering of the program triggers the interactive map 460 to display content and information with progression of the episode.

In variations, the audience can view the interactive map 460 independently of viewing an episode of the program content. For example, an individual of the audience may track the journey of a character in a reality-based entertainment program without watching the episode. To this end, the interactive map 460 may display points of significance that identifies locations where events took place in a particular episode, information (text, images, video) about the events that took place in the episode, and/or other content (e.g., user-generated content) generated pertaining to the episode.

Figure 4E:
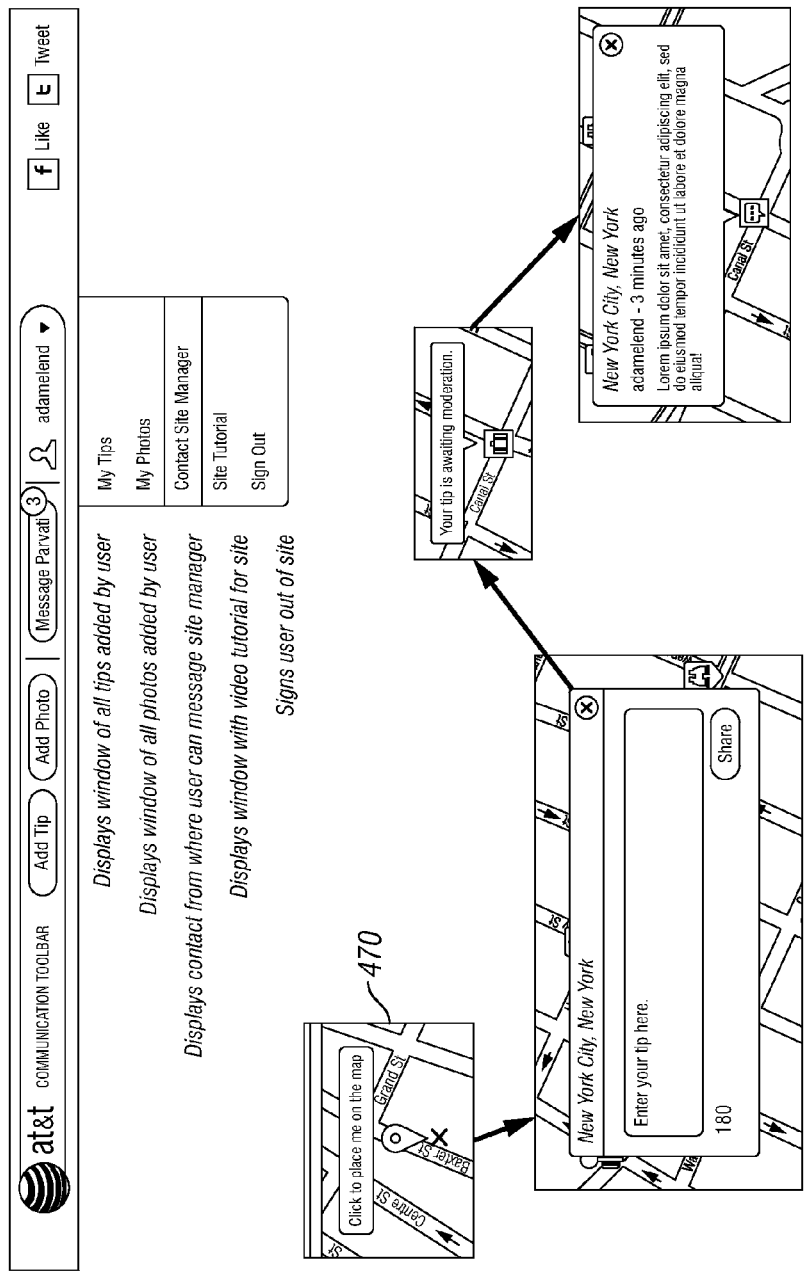

FIG. 4E illustrates an embodiment for an interactive map that can be displayed in a mode that is customized to be personal to a particular viewer. In one embodiment, the interactive map 470 can be personalized for individual viewers, so that viewers can view, for example, their user-generated content (e.g., tips or images they have posted in connection with the program and/or display of the interactive map) apart (or isolated) from other user-generated content. The user may be able to operate a user-interface 470 that enables the individual to select to view, for example, images and tips they submitted as user-generated content without displaying other similar content. The user may be able to select another mode to see, for example, all user-generated content, or content generated from a particular user (e.g., spouse) or class of users.

In one embodiment, a user can supply information to place himself on the interactive map 470, so that they can share, for example, his position relative to events displayed on the program (e.g., location of an event, locality of a character in the show). For example, the user can utilize an application that operates on a geo-aware handset to submit his location (e.g., geo-tagged message), or enter his location manually.

In addition, some embodiments enable the users to supply content and associate it with a location of the interactive map 470. For example, if the episode takes place in a city that a particular user is familiar with, the user can suggest a local restaurant for the program or its viewers, and further specify the location of the restaurant on the interactive map 470.

In some variations, the content supplied from the individual users may be posted for public viewing after being viewed by a moderator. In this way, offensive or illegal content is not posted to the interactive map 470.

Figure 4F:
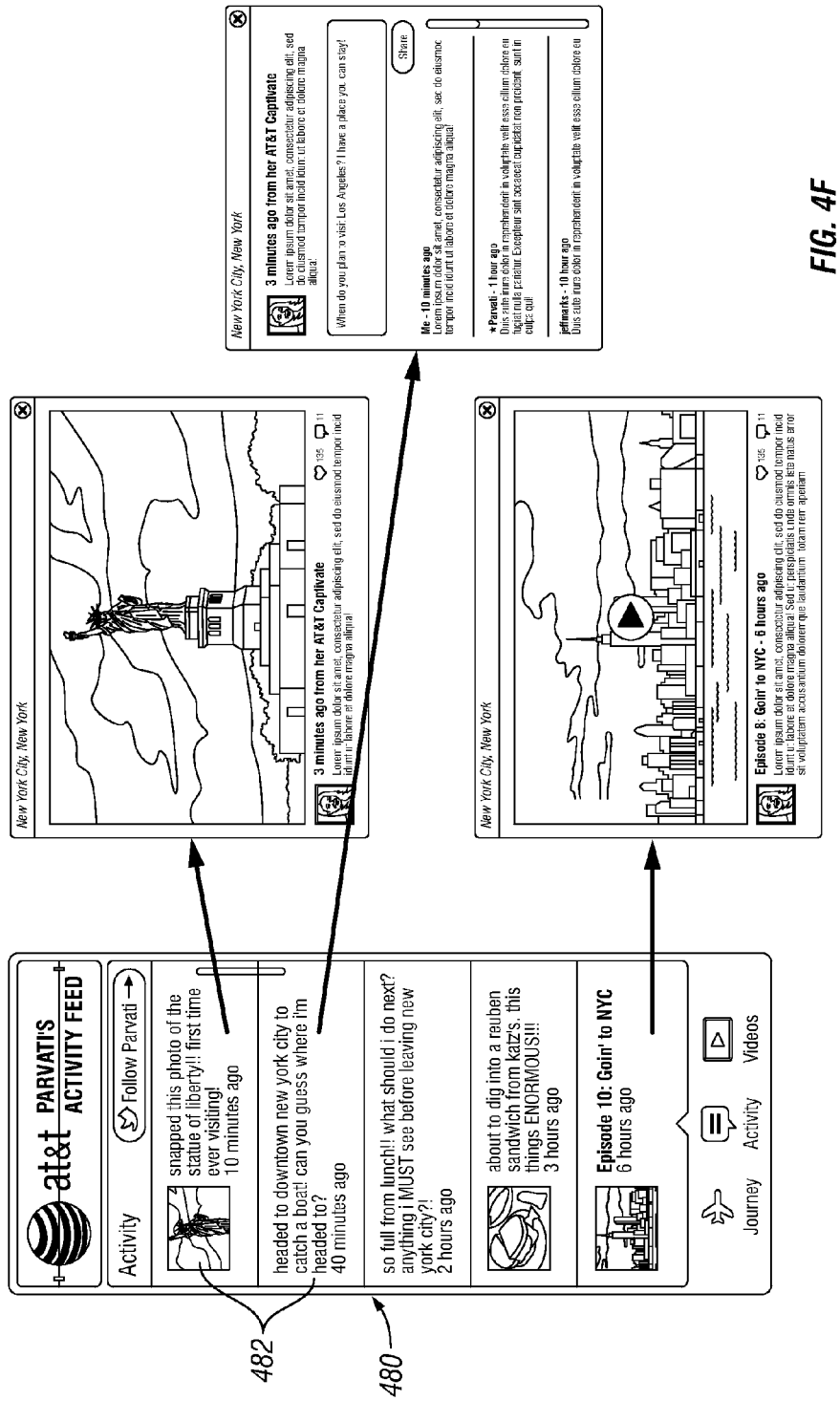

FIG. 4F illustrates an activity bar for displaying content related to a program, according to an embodiment. The user can interact with the activity bar 480 to select its entries 482, resulting in content associated with the entries 482 being displayed in greater detail. As an option, the entries 482 can be selected and opened in order to view the content associated with the entry, as well as the content associated with a particular location identified on an interactive map.

With various embodiments described, alternative or additional functionality may be incorporated to enhance the interactive experience of the individual viewers. For example, chat forums or functionality can be integrated into a web page or medium that provides the program content and/or interactive medium. The chat forums can be implemented by text, audio or video. The chat functionality can enable viewers to communicate with other viewers, with cast members (or characters of the program) or with creators of the program. In embodiments that provide for viewers a means to communicate with cast members or characters of the program, some variations enable the viewer-character interaction to effect an outcome of an event (e.g., video chat may occur during an episode), and/or affect events (or plotline) so as to influence future episodes. For example, the chat forum may enable the viewer to voice suggestions to the character of the program, who can then act on the suggestion, either in the current episode or in a following episode. In an implementation, the character may elect to select an audience member over the online medium for a chat in order to receive a suggestion or decision.

Computer System

Figure 5:
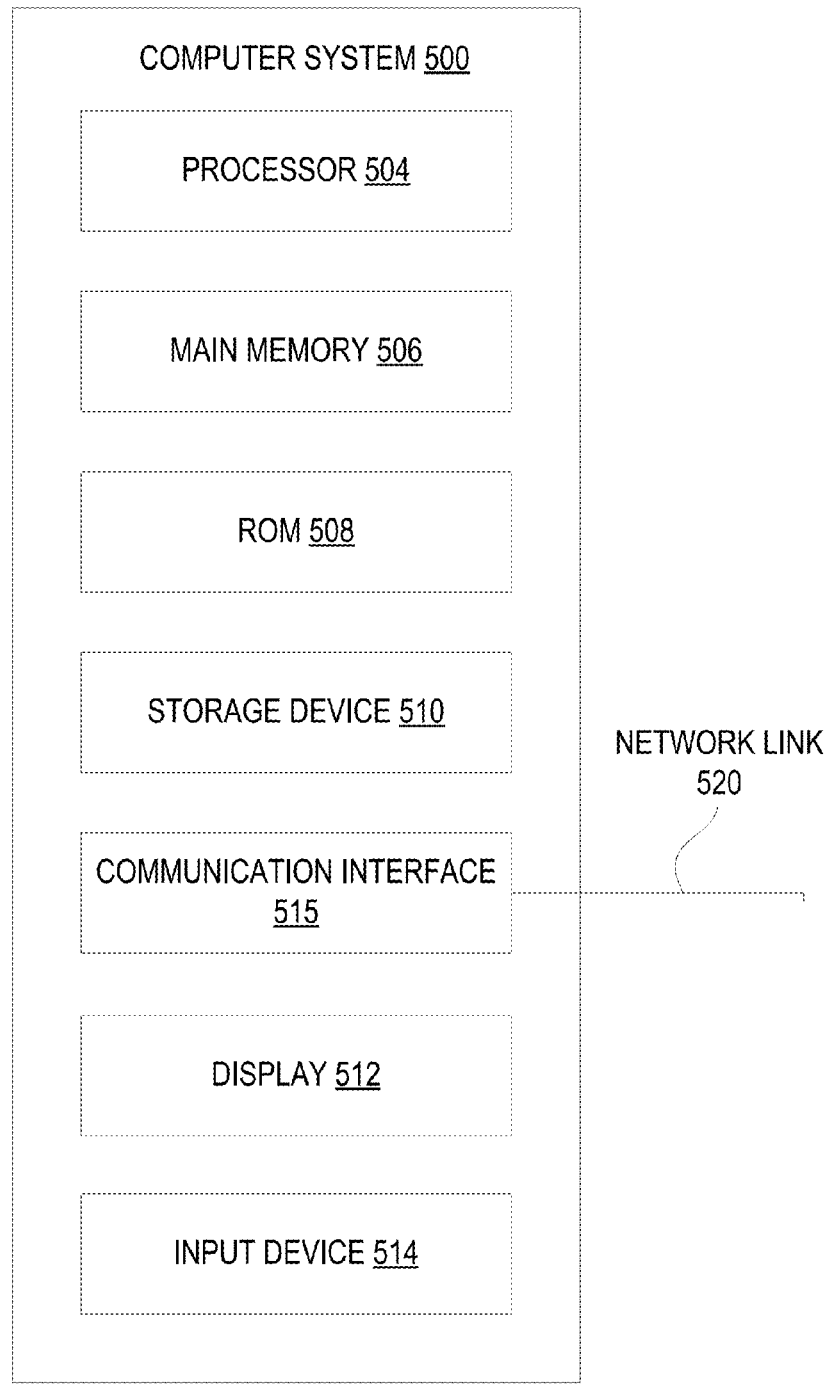
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 2A, system 100 may be implemented using a computer system such as described by FIG. 5.

In an embodiment, computer system 500 includes processor 504, main memory 506, ROM 508, storage device 510, and communication interface 515. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read-only memory (ROM) 508 or other static storage device for storing static information and instructions for processor 504. A storage device 510, such as a magnetic disk or optical disk, is provided for storing information and instructions. The communication interface 515 may enable the computer system 500 to communicate with one or more networks through use of the network link 520.

Computer system 500 can include display 512, such as a cathode ray tube (CRT), a LCD monitor, and a television set, for displaying information to a user. An input device 514, including alphanumeric and other keys, is coupled to computer system 500 for communicating information and command selections to processor 504. Other non-limiting, illustrative examples of input device 514 include a mouse, a trackball, or cursor direction keys for communicating direction information and command selections to processor 504 and for controlling cursor movement on display 512. While only one input device 514 is depicted in FIG. 5, embodiments may include any number of input devices 514 coupled to computer system 500.

Embodiments described herein are related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method implemented by one or more processors and comprising:
    using the one or more processors to perform steps comprising:
        during a broadcast of an entertainment program, generating an interactive map correlating a plurality of geographic locations with locations of one or more characters of the entertainment program;
        publishing the interactive map on a website associated with the entertainment program;
        generating a plurality of selectable markers on the interactive map, each selectable marker correlating to a respective geographic location of the plurality of geographic locations;
        associating, with each of the plurality of selectable markers, content corresponding to the respective geographic location correlated to the selectable marker; and
        in response to a new event occurring in the entertainment program during the broadcast, generating a notification on the interactive map identifying a location associated with the new event;
        wherein the website includes a webpage comprising (i) a media player to present the entertainment program, (ii) the interactive map having the plurality of selectable markers correlated to the respective geographic locations of the one or more characters of the entertainment program, and (iii) a user feedback region to poll users in order to affect a storyline of the entertainment program.

2. The method of claim 1, wherein the content comprises an image or a video file of the respective geographic location.

3. The method of claim 1, further comprising:
    providing a user-generated content region on the website in conjunction with generating the interactive map;
    receiving user-generated content, from one or more users, corresponding to the respective geographic location; and
    generating, on the interactive map, a selectable feature for the respective geographic location enabling users to display the user-generated content provided by the one or more users.

4. The method of claim 1, further comprising:
    segmenting a route, connected by the plurality of selectable markers, into a plurality of segments, each segment associated with video content forming a portion of the entertainment program.

5. The method of claim 4, wherein individual segments of the plurality of segments are associated with an episode of the entertainment program.

6. The method of claim 1, further comprising:
    on the generated interactive map, displaying geographic elements related to one or more additional entertainment programs.

7. The method of claim 1, further comprising:
    providing advertising content on an advertising region of the web page, the advertising content corresponding to one or more business establishments related to the location associated with the new event.

8. The method of claim 1, wherein the entertainment program is a reality-based entertainment program, and wherein the one or more characters correspond to one or more characters of the reality-based entertainment program.

9. The method of claim 8, wherein correlating the plurality of geographic locations with the one or more characters includes detecting geographic information originating from electronic devices carried by the one or more characters in the reality-based entertainment program in order to generate the plurality of selectable markers on the interactive map.

10. The method of claim 8, further comprising:
detecting geo-tags in communications provided by the one or more characters in the reality-based entertainment program in order to attach the content to each of the plurality of selectable markers, wherein the attached content corresponds to the communications provided by the one or more characters.

11. The method of claim 10, wherein the communications corresponds to text content or image content provided by the one or more characters via one or more social media applications.

12. A non-transitory computer-readable medium storing instructions that, when executed by one or more processors, cause the one or more processors to perform operations comprising:
during a broadcast of an entertainment program, generating an interactive map correlating a plurality of geographic locations with one or more characters of the entertainment program;
publishing the interactive map on a website associated with the entertainment program;
generating a plurality of selectable markers on the interactive map, each selectable marker correlating to a respective geographic location of the plurality of geographic locations;
associating, with each of the plurality of selectable markers, content corresponding to the respective geographic location correlated to the selectable marker; and
in response to detecting a new event occurring in the entertainment program during the broadcast, generating a notification on the interactive map identifying a location associated with the new event;
wherein the website includes a webpage comprising (i) a media player to present the entertainment program, (ii) the interactive map having the plurality of selectable markers correlated to the respective geographic locations of the one or more characters of the entertainment program, and (iii) a user feedback region to poll users in order to affect a storyline of the entertainment program.

13. The non-transitory computer-readable medium of claim 12, wherein the content comprises an image or a video file.

14. The non-transitory computer-readable medium of claim 12, wherein the instructions, when executed by the one or more processors, cause the one or more processor to perform further operations comprising:
providing a user-generated content region on the website in conjunction with generating the interactive map;
receiving user-generated content, from one or more users, corresponding to the respective geographic location; and
generating, on the interactive map, a selectable feature for the respective geographic location enabling users to display the user-generated content provided by the one or more users.

15. The non-transitory computer-readable medium of claim 12, wherein the instructions, when executed by one or more processors, cause the one or more processor to perform further operations comprising:
segmenting a route, connected by the plurality of selectable markers, into a plurality of segments, each segment associated with video content forming a portion of the entertainment program.

* * * * *